(12) United States Patent
Kramer

(10) Patent No.: US 6,184,633 B1
(45) Date of Patent: Feb. 6, 2001

(54) REDUCTION OF VERTICAL SEGREGATION IN A DISCHARGE LAMP

(75) Inventor: Jerry M. Kramer, Yorktown Heights, NY (US)

(73) Assignee: Philips Electronics North America Corporation, New York, NY (US)

(*) Notice: Under 35 U.S.C. 154(b), the term of this patent shall be extended for 0 days.

(21) Appl. No.: 09/335,020

(22) Filed: Jun. 17, 1999

(51) Int. Cl.[7] .................................................. H05B 41/16
(52) U.S. Cl. ............................................. 315/246; 315/291
(58) Field of Search .................................... 315/246, 174, 315/291, 307, 326; 332/120, 149, 117, 179

(56) References Cited

U.S. PATENT DOCUMENTS

| | | | |
|---|---|---|---|
| 4,137,484 | * | 1/1979 | Osteen ................................. 315/209 |
| 4,373,146 | * | 2/1983 | Bonazoli et al. ..................... 315/209 |
| 4,740,729 | * | 4/1988 | Chow ................................... 313/493 |
| 4,839,565 | * | 6/1989 | Osteen ................................. 315/209 |
| 4,904,903 | * | 2/1990 | Pacholok ............................. 315/209 |
| 4,963,796 | * | 10/1990 | Gottschling et al. ................ 315/246 |
| 5,134,345 | * | 7/1992 | El-Hamamsy et al. .............. 315/248 |
| 5,198,727 | * | 3/1993 | Allen et al. .......................... 315/291 |
| 5,306,987 | * | 4/1994 | Dakin et al. ......................... 315/248 |
| 5,365,151 | * | 11/1994 | Spiegel et al. ....................... 315/209 |
| 5,508,592 | * | 4/1996 | Lapatovich et al. ................ 315/248 |
| 5,684,367 | * | 11/1997 | Moskowitz et al. ................ 315/246 |
| 5,990,633 | * | 11/1999 | Hirschmann et al. .............. 315/289 |

FOREIGN PATENT DOCUMENTS

| | | | | |
|---|---|---|---|---|
| 0615278A1 | * | 9/1994 | (EP) | ............................. H01J/65/04 |
| 0785702A2 | | 7/1997 | (EP) . | |

* cited by examiner

Primary Examiner—Don Wong
Assistant Examiner—Trinh Vo Dinh
(74) Attorney, Agent, or Firm—Bernard Franzblau

(57) ABSTRACT

An apparatus for reducing vertical segregation of a discharge lamp. A current/voltage input sweeps through a frequency range between the first azimuthal acoustic resonance mode and a first radial acoustic resonance mode of the discharge lamp. The current/voltage input is subsequently amplitude modulated. Alternatively, without amplitude modulation, the current/voltage input sweeps through the frequency range for a first portion of the period, and then for a second portion of the period drops to a relatively constant frequency.

28 Claims, 2 Drawing Sheets

REDUCTION OF VERTICAL SEGREGATION IN A DISCHARGE LAMP

BACKGROUND OF THE INVENTION

This invention relates to a ballast for high-intensity gas discharge lamps. More specifically, it relates to the reduction of vertical color segregation in a high intensity gas discharge lamp by the use of sequential excitation of the input power or the use of frequency sweep in combination with amplitude modulation.

Discharge lamps have been operated in pulsed mode, as illustrated in U.S. Pat. No. 4,904,903.This patent teaches methods of operating fluorescent mercury vapor, sodium and metal halide (MH) lamps, so that the input is electronically, periodically gated for a portion of the wave period. This pulsed operation is effective in eliminating undesirable electromagnetic and radio interference emissions.

Color control of high-intensity discharge (HID) lamps by pulsing techniques is also well known as shown by U.S. Pat. Nos. 4,137,484, 4,839,565, and 4,963,796. Japanese Patent No. 432153 teaches the use of exterior temperature regulation to control the color of the discharge lamp. Other color-controlling methods include interior temperature regulating techniques and varying the salts within the discharge tube.

One of the major problems in the operation of discharge lamps is the deformation of the arc within the discharge tube by convective gas flow. Techniques for stabilizing and centering this arc have been developed. U.S. Pat. No. 5,134,345 illustrates a method of avoiding acoustic frequencies that cause destabilizing phenomena. The method of this patent teaches the detection of arc instabilities, and changing the drive frequencies that cause them.

In U.S. Pat. No. 5,306,987, an arc stabilization technique is illustrated in which the frequency of the drive signal is modulated. A similar method of controlling the arc in discharge lamps is illustrated in U.S. Pat. No. 5,198,727. With this method, the arc is centered by the "acoustic perturbations" induced by the frequency of the drive signals. The acoustic perturbations compel the gas or vapor movement patterns to counter the gravity-induced convection.

U.S. Pat. No. 5,684,367 discloses a method of controlling arc destabilization in HID lamps by amplitude modulation of a high frequency signal and pulsing the lamp, which can be used to change the color characteristics of the lamp.

A new class of high intensity discharge lamps has been produced in the past five years with ceramic (polycrystalline alumina) envelopes. Philips Lighting Company of Somerset, N.J., for example, sells such ceramic discharge metal halide (CDM) lamps under the trademark MASTERCOLOR™. The discharge envelope is cylindrical in shape, and the aspect ratio, i.e., the inner length (IL) divided by the inner diameter (ID) is close to one. At least one new type of cylindrical lamp is being developed which has a much larger aspect ratio. Such new lamps have the desirable property of higher efficacy, but they have the disadvantage of having different color properties in vertical and horizontal operation. In particular, in vertical operation color segregation occurs. Projecting an image of the arc onto a screen shows that the bottom part of the arc appears pink while the top part looks green. This is caused by the absence of complete mixing of the atomic metal additives in the discharge. In the upper part of the discharge there is too much thallium emission and insufficient sodium emission. The result of vertical segregation is a lamp with higher color temperature compared to horizontal operation and possibly decreased efficacy.

SUMMARY AND OBJECTS OF THE INVENTION

It is an object of the invention to provide an improved ballast for a high-intensity discharge lamp.

It is also an object of the invention to reduce vertical color segregation in a high-intensity discharge lamp.

These and other objects are attained by a first aspect of the invention wherein a high intensity discharge lamp is operated through a current frequency sweep within a sweep time, in combination with amplitude modulation. The typical parameters for such operation are a current frequency sweep from 45 to 55 kHz within a sweep time of 10 milliseconds, a constant amplitude modulation frequency of 24.5 kHz and a 0.24 of modulation index. The modulation index is defined as $(V_{max}-V_{min})/(V_{max}+V_{min})$, where $V_{max}$ is the maximum peak to peak voltage of the amplitude modulated envelope and $V_{min}$ is the minimum peak to peak voltage of the amplitude modulated envelope. This frequency range of 45 to 55 kHz is between the first azimuthal acoustic resonance mode and the first radial acoustic resonance mode. Definitions of the acoustic resonances—For a cylindrical lamp the power frequency of the first azimuthal mode is equal to $1.84*C_r/\pi*D$ where $C_r$ is the average speed of sound in the radial plane and D is the inner diameter of the lamp.

The power frequency of the first radial acoustic resonance mode is equal to $3.83*C_r/\pi*D$ where $C_r$ is the average speed of sound in the radial plane and D is the inner diameter of the lamp.

These and other objects are likewise achieved by a second aspect of the invention wherein a swept high frequency (current) sine wave is followed in time by a fixed current frequency sine wave, corresponding approximately to one half of the power frequency of a longitudinal acoustic mode, this sequence being continuously repeated.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1A:
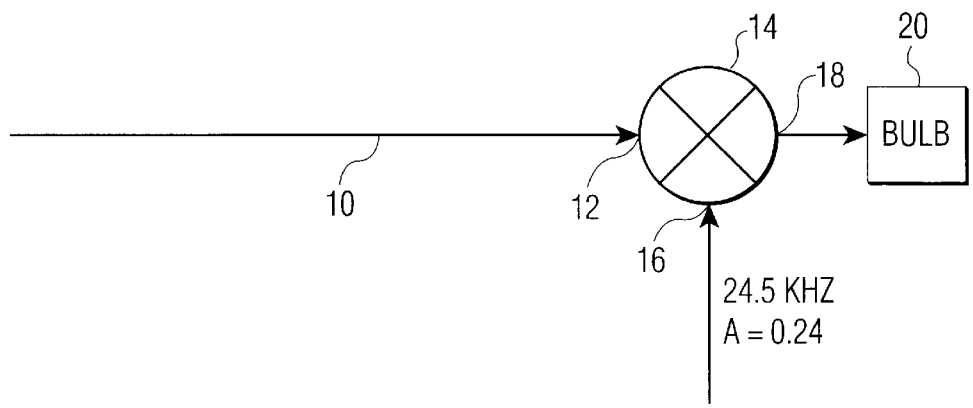
FIG. 1A is a block diagram of the first aspect of the invention.
Figure 1B:
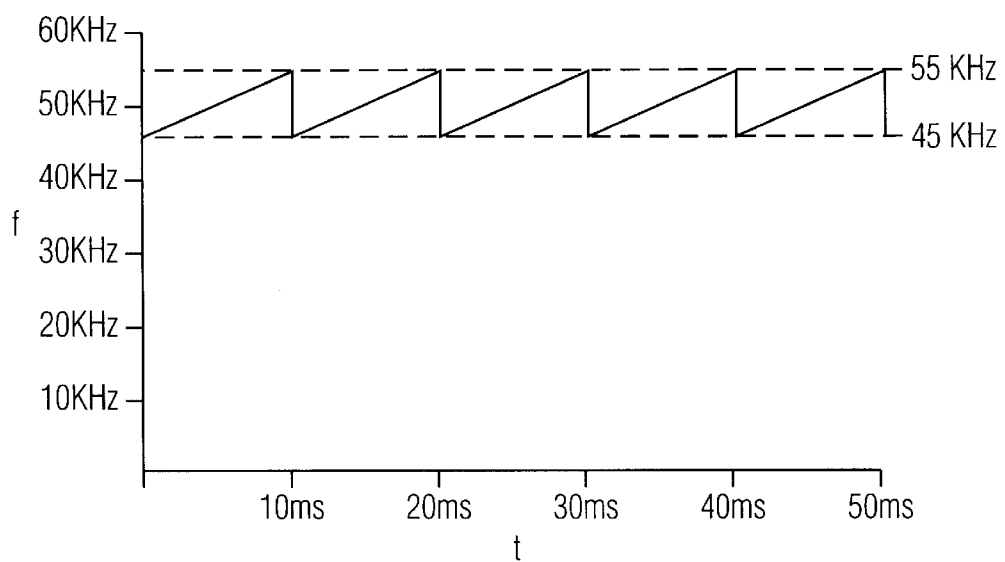
FIG. 1B is a timing diagram illustrating the frequency sweep in combination with amplitude modulation.

Referring now to the drawings in detail wherein like numerals refer to like elements throughout the several views, one sees that FIGS. 1A and 1B illustrate the aspect of frequency sweep in combination with amplitude modulation in the present invention.

Input power line 10 provides power, as shown in the accompanying timing diagram, with a frequency which sweeps from 45 kHz to 55 kHz every ten milliseconds in a sawtooth pattern (other patterns in accordance with the invention are also possible). This input power line 10 leads to input 12 of modulator 14. Modulator 14 likewise receives the amplitude modulating signal of 24.5 kHz, A=0.24, through input 16 of modulator 14 thereby producing the resultant power output on output 18 of modulator 14, which is provided to high intensity discharge lamp 20. This frequency range of 45 to 55 kHz is between the first azimuthal acoustic resonance mode and the first radial acoustic resonance mode. Although there are additional acoustic resonance modes between 45 and 55 kHz, the frequency sweep is sufficiently fast and the resonances sufficiently weak that the lamp is stable. Stable lamp operation can be obtained with a 10 kHz frequency sweep within a range between about 40 kHz to about 70 kHz. Since the frequencies of the first azimuthal acoustic resonance mode and the first radial acoustic resonance mode only depend on the diameter, this frequency range can work for 4 mm ID lamps with other lengths. Although stable lamp operation is observed at high frequency, the color properties are very similar to those observed at low frequency (<500 Hz) and vertical segregation is still present.

One advantage of high frequency over low frequency is that in horizontal operation sweeping through the weak acoustic resonances straightens the arc between the electrodes. Normally at low frequency the arc is bowed up by convection.

The temperature of the upper wall of the arc tube is higher when the arc is bowed up leading to more rapid degradation of the arc tube envelope.

When a lamp is operated at a current frequency x, the power frequency is at 2x. It is the power frequency which is important for exciting acoustic resonances. Amplitude modulation of the current frequency can be represented mathematically by $$\cos(x) * [1 + A * \cos(y)],$$

where y is the frequency of the amplitude modulation and A is the modulation index (A<1). Squaring the amplitude modulated signal to get the power spectrum and keeping only terms in A, one gets power frequencies at 2x, 2x+y, 2x−y and y. The power at y is twice the power at 2x+y or 2x−y. If the frequency is swept, according to the invention, the satellites at 2x+y and 2x−y will be swept as well (e.g., 2x+2Δx+y), but the power frequency at y remains fixed. As shown in FIG. 1B, the amplitude modulation frequency is at 24.5 kHz and produces a fixed power frequency at that value. The amplitude modulation frequency y must be less than the current frequency x.

Longitudinal acoustic resonance modes can move the metal halides in the lamp axially. The power frequency of the $n^{th}$ longitudinal mode is equal to $n*C_1/2*L$ where n the mode number, $C_1$ is the average speed of sound in the axial plane and L is the inner length of the lamp. As an example, when the 39 W 5×6 CDM lamp was operated at about 67 kHz power frequency in a vertical orientation, the liquid metal halide condensate moved from its normal position at the bottom of the lamp to a position approximately ⅓ of the length above the bottom. The frequency of 67 kHz corresponds to the second longitudinal acoustic mode.

Cylindrical lamps of different wattage and aspect ratios much larger than 1 were operated vertically with a high frequency sweep. The lamps were stable, but showed vertical color segregation. The segregation was more severe with lamps of the same dimensions that contained larger amounts of mercury. Amplitude modulating the high frequency sweep had a dramatic effect on the color properties of the lamp. The color segregation was significantly reduced, the color temperature decreased (reflecting the increased sodium emission in the top part of the discharge) and the efficacy increased. The amplitude modulation frequency which was most effective in reducing the color segregation corresponded to the second longitudinal mode. The first longitudinal mode, which is at about ½ the frequency of the second longitudinal mode, was less effective in reducing the color segregation. Small differences in the frequency of the second longitudinal mode due to tolerances in lamps of the same dimensions and amounts of mercury can be handled by sweeping the amplitude modulation frequency over a small frequency range.

For lamps of different dimensions the frequency of the second longitudinal mode is easily measured or predicted. Thus, the frequency required to reduce vertical segregation by amplitude modulation can be determined reliably. With this frequency information amplitude modulation was used successfully to reduce color segregation in Masterflux lamps of different dimensions and wattages.

Experiments were conducted to reduce vertical segregation by operating lamps with a low frequency (500 Hz) square wave driver and high frequency sine wave superimposed. The frequency of the sine wave was varied about the frequency of both the second and first longitudinal modes. Although the high frequency sine wave excited the second (or first) longitudinal mode, the reduction of color segregation was less than with the amplitude modulation described above. More importantly, when the amplitude of the high frequency sine wave was increased too much the arc distorted against the side of the arc tube near the bottom electrode. If the high frequency sine wave voltage had not been reduced significantly or the frequency changed, the arc tube would have overheated and cracked. With amplitude modulation much higher, levels of excitation of the second longitudinal mode are possible and the arc remains stable and straight.

Frequency sweeping appears to be important in stabilizing the discharge when amplitude modulation is present. A lamp was operated at a fixed high frequency with the frequency carefully chosen for stable operation. Although vertical segregation was reduced by amplitude modulation at the second (and first) longitudinal mode, the arc became unstable at amplitude modulation voltages which corresponded to stable operation during frequency sweeping. At other discrete frequencies, stable operation was only possible at reduced amplitude modulation voltages compared to frequency sweeping. When a lamp is frequency swept, aximuthal-longitudinal combination modes are weakly excited. These modes could help to stabilize the arc while amplitude modulation strongly excites a pure longitudinal mode.

Figure 2A:
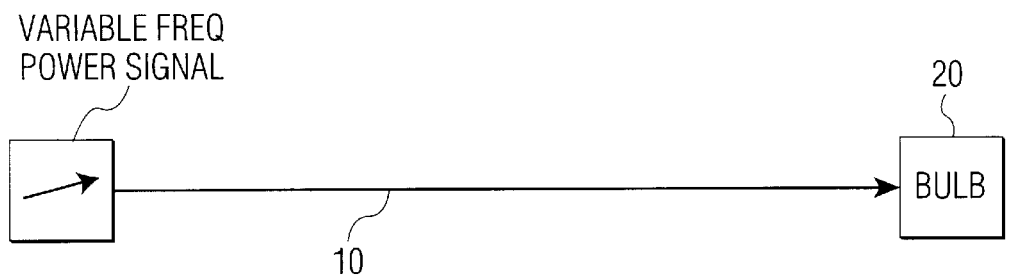
FIG. 2A is a block diagram of the second aspect of the invention and FIG. 2B is a timing diagram illustrating the sequential excitation, including a period of frequency sweep followed by a period of fixed frequency.
Figure 2B:
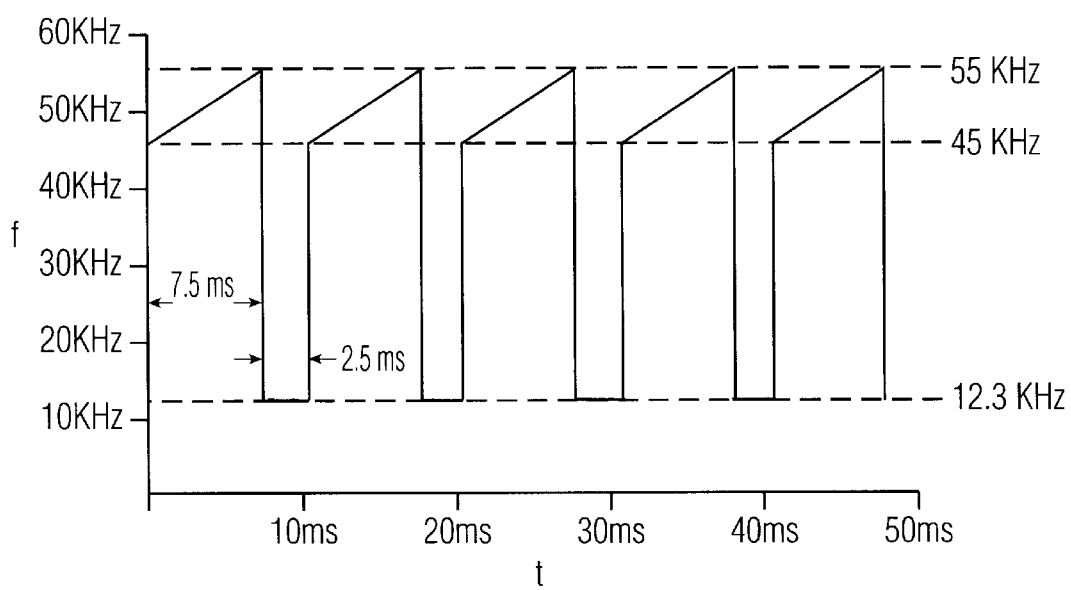

As shown in FIGS. 2A and 2B, input line 10 likewise provides power, and the accompanying timing diagram shows that in the 10 millisecond period, the frequency sweeps from 45 to 55 kHz during the first 7.5 seconds and then drops to 12.3 kHz for 2.5 milliseconds. The cycle then repeats. This is sequential excitation. This power is provided to bulb 20, typically without the need for amplitude modulation.

With sequential excitation in this second aspect of the invention, the swept current frequencies can be the same as described above in connection with FIGS. 1A and 1B. However, the fixed frequency required to excite a longitudinal mode is at one half the frequency required for amplitude modulation (note that 12.3 kHz is approximately one half of the modulating frequency of 24.5 kHz of the first aspect). The power frequencies with sequential excitation are at twice the swept frequencies and at twice the fixed current frequency. For example, when the current frequencies are 45 kHz to 55 kHz during the frequency sweep, then the power frequencies are 90 kHz to 110 kHz. When the fixed current frequency is at 12.3 kHz, then the fixed power frequency is at 24.6 kHz. These are the same power frequencies obtained with amplitude modulation. One advantage for sequential excitation (second aspect) over amplitude modulation (first aspect) is that with amplitude modulation there are additional power frequencies which could excite deleterious acoustic resonances. These additional power frequencies occur at twice the instantaneous sweep frequency plus and minus the modulation frequencies (e.g., 2x+2Δx+y; 2x+2Δx−y). With sequential excitation, the duty cycle, or on-time, for fixed frequency is a variable which serves an analogous function to the amplitude of the amplitude modulation.

Both sequential excitation and amplitude modulation utilize power frequencies which operate the lamp in a stable manner and a fixed power frequency at approximately a longitudinal acoustic mode. The power frequencies are determined by the frequency dependence of the product of the current and voltage waveforms. Other waveforms which can generate power frequencies which operate the lamp in a stable manner and at a fixed power frequency at approximately a longitudinal acoustic mode are contemplated by this disclosure.

As a variation to generating a fixed frequency at approximately a longitudinal acoustic mode, the otherwise fixed frequency can vary or sweep over a small range (e.g., can ramp or sweep from about 12.3 kHz to about 12.5 kHz or vice versa during the 2.5 ms period). For instance, the otherwise fixed frequency can alternate between a first fixed frequency and a second fixed frequency, the first and second frequencies differing by less than one kHz. For example, sweep (45 kHz to 55 kHz), first fixed frequency (12.3 kHz), sweep (45 kHz to 55 kHz), second fixed frequency (12.5 kHz), sweep (45 kHz to 55 kHz), first fixed frequency (12.3 kHz), sweep (45 kHz to 55 kHz), second fixed frequency (12.5 kHz), etc.

The parameters given for both aspects of this invention are typical parameters and may be varied depending upon the application.

EXAMPLES

Example 1

A 70 watt, high intensity discharge lamp of cylindrical shape with dimensions or 4 mm ID×19 mm IL with 40 bar Hg was operated vertically with a frequency sweep from 45 to 55 kHz in 10 ms. The color properties of the lamp with and without amplitude modulation are set forth in the following table:

| Amplitude Modulation | Orientation | Color Temperature (° K.) | CRI | x | y | Efficacy Lumens Per Watt (LPW) |
|---|---|---|---|---|---|---|
| None | Vertical | 3873 | 76.8 | .396 | .415 | 112.6 |
| 24% @ 22.5 kHz | Vertical | 2580 | 87.6 | .456 | .389 | 112.0 |

Amplitude modulation (A=0.24) decreased the color temperature by about 1300° K, increased the color rendering index (CRI) by 10, increased the x color coordinate and decreased the y color coordinate. The frequency of the second longitudinal mode is at about 22.5 kHz.

Example 2

A 70 watt, high intensity discharge lamp of cylindrical shape with dimensions or 4 mm ID×19 mm IL with 15 bar Hg was operated vertically (45 to 55 kHz in 10 ms) and horizontally (50 to 60 kHz in 10 ms). The results are set forth in the following table:

| Amplitude Modulation | Orientation | Color Temperature (° K.) | CRI | x | y | Efficacy (LPW) |
|---|---|---|---|---|---|---|
| None | Vertical | 3151 | 68.7 | .441 | .431 | 99.4 |
| 24% @ 25.0 kHz | Vertical | 2670 | 76.9 | .462 | .411 | 103.8 |
| None | Horizontal | 2828 | 78.5 | .450 | .408 | 108.7 |
| 24% @ 25.0 kHz | Horizontal | 2783 | 79.7 | .456 | .414 | 102.8 |

Without amplitude modulation the color temperatures in the two orientations differed by about 300° K. Amplitude modulation at the second longitudinal mode (25 kHz) reduced the color temperature by about 500° K in vertical operation and only about 50° K in horizontal operation. The net result was that with amplitude modulation the color temperature in the two orientations differed by about 100° K. Amplitude modulation in horizontal operation moved some of the condensate to positions ⅓ and ⅔ along the length of the lamp. Moving condensate away from the electrodes could have a beneficial effect on lamp maintenance.

Example 3

A 70 watt, high intensity discharge lamp of cylindrical shape with dimensions or 4 mm ID×19 mm IL with 15 bar Hg was operated vertically with a current frequency sweep from 45 to 55 kHz in 10 ms. In the table below the color properties of the lamp with swept HF are compared with sequential excitation and amplitude modulation:

| Excitation | Frequencies | Color Temp. (° K.) | CRI | x | y |
|---|---|---|---|---|---|
| FM Sweep | 45 to 55 kHz (10 ms) | 3178 | 69.1 | .440 | .432 |
| FM sweep + fixed frequency (sequential) | 45 to 55 kHz (7.5 ms) + 12.3 kHz (2.5 ms) | 2731 | 77.0 | .460 | .415 |
| FM Sweep + AM modulation | 45 to 55 kHz (10 ms) 24% @ 25 kHz | 2670 | 76.9 | .462 | .411 |

Sequential excitation and amplitude modulation both produced similar color properties. Compared to swept HF alone sequential excitation and amplitude modulation decreased the color temperature and the y color coordinate while increasing the color rendering index and the x color coordinate. In the sequential excitation the fixed current frequency of 12.3 kHz corresponds to a power frequency of 24.6 kHz which is close to the frequency of the second longitudinal mode. The similar color properties of the lamp with amplitude modulation and time sequential excitation demonstrate clearly that excitation of the second longitudinal mode reduces vertical segregation. Amplitude modulation and time sequential excitation are two different ways of exciting this longitudinal mode. The rms voltage of the lamp with swept HF was 161 V and with sequential excitation the rms voltage was 180 V at approximately the same power.

Example 4

A 70 watt, high intensity discharge lamp of cylindrical shape with dimensions or 4 mm ID×19 mm IL with 25 bar Hg was operated vertically with a current frequency sweep from 45 to 55 kHz in 10 ms. The results are set forth in the following table:

| Excitation | Frequencies | Color Temp. (° K.) | CRI | x | y |
|---|---|---|---|---|---|
| FM sweep | 45 to 55 kHz (10 ms) | 4152 | 65.4 | .388 | .429 |
| FM sweep + fixed frequency (sequential) | 45 to 55 kHz (7.5 ms) + 12.1 kHz (2.5 ms) | 2944 | 78.0 | .444 | .413 |

With only swept FM the color temperature was above 4000° K with a CRI of about 65. Sequential excitation with a fixed current frequency of 12.1 kHz decreased the color temperature to a value below 3000 K with a CRI of 78. Visually the lamp with only swept FM showed significant color segregation with the condensate only at the bottom of the arc tube. The bottom quarter of the discharge appeared pink and the top three quarters appeared green. With the addition of sequential excitation the bottom four fifths of the discharge appeared pink and the top fifth appeared green with condensate in a band approximately one quarter up from the bottom of the arc tube. The pink color corresponds to good mixing of the metal halide additives in the discharge whereas the green color corresponds to a deficiency of sodium and dysprosium emission.

Although amplitude modulation has been described as a method to eliminate color segregation, it could also be used to make a single vertical lamp having two different color temperatures. A high color temperature would be obtained without amplitude modulation and a lower color temperature would be possible by activating amplitude modulation in the ballast. Depending on the linearity of the amplitude modulation on the color temperature, one could produce a vertical lamp with a range of color temperatures. For a series of lamps in a critical application the amount of amplitude modulation for individual lamps could be adjusted to minimize color differences between lamps. If a simple method existed to monitor color temperature, a feedback mechanism could be used to keep color temperature constant over the life of the lamp by adjusting the amount of amplitude modulation.

As with amplitude modulation, sequential excitation can be used to make a single vertical lamp having two different color temperatures, simply by turning on and off the fixed frequency. A range of color temperatures is possible by varying the on-time of the fixed frequency. For a series of lamps in a critical application the amount of sequential excitation for individual lamps could be adjusted to minimize color differences between lamps. A feedback mechanism could be used to keep color temperature constant over the life of the lamp by adjusting the amount of sequential excitation.

The advantages of color mixing as provided by this invention include first universal lamp operation. The light technical properties of the lamp are very similar in horizontal and vertical orientation with little change in the desirable color properties of horizontal operation. A single lamp can be sold for all orientations instead of restricting the lamp orientation to horizontal only. Second, excitation of the second longitudinal mode is general and can be applied to a broad range of lamps—both in wattage and dimensions. From a ballast perspective this method offers a platform solution. Third, the invention doesn't rely on finding a resonance free window that is very sensitive to lamp dimensions or changes in lamp properties with life. Fourth, color mixing is advantageous for preserving good color properties during dimming. Fifth, the color rendering indices of the saturated yellow (R10) and saturated blue (R12) increase by about 30 and the saturated red (R9) increases by about 50. These improvements are not reflected in the general color rendering index (CRI) which is the average of R1 through R8.

The preceding specific embodiments are illustrative of the practice of the invention. It is to be understood, however, that other expedients known to those skilled in the art or disclosed herein, may be employed without departing from the spirit of the invention or the scope of the appended claims.

What is claimed is:

1. An apparatus for operating a high-intensity discharge lamp, which comprises:
   an amplitude modulator with a first input, a second input and an output coupled to the lamp,
   means for providing a current to said first input, said current periodically sweeping from a first frequency to a second frequency in a sweep time; and
   means for providing to said second input a modulating frequency which excites a longitudinal mode of the lamp wherein metal halides within the lamp are moved along the lamp axially in response to the level of longitudinal mode excitation.

2. The apparatus of claim 1, wherein said first frequency and said second frequency define a frequency range which is between a first azimuthal acoustic resonance mode and a first radial acoustic resonance mode of said lamp.

3. The apparatus of claim 2, wherein said first frequency is substantially equal to 45 kHz and said second frequency is substantially equal to 55 kHz.

4. The apparatus of claim 1, wherein said sweep time is substantially equal to ten milliseconds.

5. The apparatus of claim 4, wherein said modulating frequency is substantially equal to 24.5 kHz.

6. The apparatus of claim 5, wherein said modulator has an amplitude modulation index of substantially 0.24.

7. An apparatus for operating a high-intensity discharge lamp, which comprises:
   means for providing an input power signal to the high-intensity discharge lamp, and
   means for varying said input power signal over a period, said period having a first portion and a second portion, wherein the input power signal sweeps from a first frequency to a second frequency during said first portion of said period and wherein said input power signal maintains a substantially constant third frequency during said second portion of said period, and wherein the third frequency excites a longitudinal mode of the lamp and wherein metal halides within the lamp are moved along the lamp axially and vertical segregation of light output from said lamp is reduced in response to the longitudinal mode excitation.

8. The apparatus of claim 7, wherein said substantially constant third frequency is substantially equal to one half of a power frequency of a longitudinal acoustic mode of the lamp.

9. The apparatus of claim 8, wherein said substantially constant third frequency is substantially equal to 12.3 kHz.

10. The apparatus of claim 9, wherein said first frequency is substantially equal to 45 kHz and said second frequency is substantially equal to 55 kHz.

11. The apparatus of claim 7, wherein said first portion of said period is substantially equal to 7.5 milliseconds and said second portion of said period is substantially equal to 2.5 milliseconds.

12. The apparatus of claim 7, wherein the apparatus is without an amplitude modulator.

13. An apparatus for operating a high intensity discharge lamp comprising:

an amplitude modulator having a first input, a second input and an output coupled to the lamp, means for providing a current to said first input, said current periodically sweeping from a first frequency to a second frequency in a sweep time, and means for providing to said second input an amplitude modulating signal at a modulating frequency which excites a longitudinal acoustic mode of the lamp whereby vertical color segregation in the lamp is reduced in response to said longitudinal acoustic mode excitation.

14. The apparatus as claimed in claim 13 wherein said first frequency and said second frequency define a frequency range which is between a first azimuthal acoustic resonance mode and a first radial acoustic resonance mode of said lamp.

15. The apparatus as claimed in claim 13 wherein the modulating signal is a non-pulsatory constant frequency signal which amplitude modulates the frequency swept current.

16. The apparatus as claimed in claim 13 wherein the amplitude modulation frequency is lower than the current frequency.

17. The apparatus as claimed in claim 13 wherein the amplitude modulating frequency corresponds to a second longitudinal acoustic mode of the lamp.

18. The apparatus as claimed in claim 13 which further comprises means for sweeping the amplitude modulating frequency over a small frequency range relative to a frequency range defined by said first frequency and said second frequency.

19. An apparatus for operating a high intensity discharge lamp comprising:

means for supplying over a time period a varying input power signal to the high intensity discharge lamp without amplitude modulation thereof, said input power signal having a first portion and a second portion of said time period such that the input power signals sweeps from a first frequency to a second frequency during said first portion of said time period and wherein said input power signal maintains a substantially constant third frequency during the second portion of said time period, and wherein the third frequency excites a longitudinal acoustic mode of the lamp whereby vertical segregation of light output from said lamp is reduced in response to the longitudinal acoustic mode excitation.

20. The apparatus as claimed in claim 19 wherein said substantially constant third frequency is substantially equal to one half of a power frequency of a longitudinal acoustic mode of the lamp.

21. The apparatus as claimed in claim 19 further comprising means for sweeping the input power signal during said second portion of said period over a small frequency range relative to a frequency range defined by said first frequency and said second frequency.

22. The apparatus as claimed in claim 19 further comprising means for alternating the frequency of the input power signal during said second portion of said period between a fourth fixed frequency and a fifth fixed frequency.

23. A method of operating a high intensity discharge lamp, comprising:

supplying the high intensity discharge lamp with an input power waveform, stabilizing an arc discharge of the lamp by periodically sweeping the frequency of said input power waveform from a first frequency to a second frequency in a sweep time period, and exciting a longitudinal acoustic mode in said lamp.

24. The method as claimed in claim 23 wherein said longitudinal acoustic mode is excited in the lamp by amplitude modulating the input power waveform with a modulating frequency.

25. The method as claimed in claim 24 wherein said modulating frequency is lower than any frequency in a frequency range defined by said first frequency and said second frequency.

26. The method as claimed in claim 23 wherein the amplitude modulating frequency corresponds to a second longitudinal acoustic mode of the lamp.

27. The method as claimed in claim 23 wherein the arc discharge is stabilized by periodically sweeping the frequency of said input power waveform from the first frequency to the second frequency in a first portion of the sweep time period, and said longitudinal acoustic mode is excited in the lamp by maintaining the frequency of said input power waveform at a substantially constant third frequency during a second portion of the sweep time period.

28. The method as claimed in claim 27 wherein said substantially constant third frequency is substantially equal to one half of a power frequency of a longitudinal acoustic mode of the lamp.

* * * * *